United States Patent
Xiao et al.

(10) Patent No.: US 10,100,790 B1
(45) Date of Patent: Oct. 16, 2018

(54) DIAGNOSING AN AIR FILTER WITH AN ELECTRIC BOOSTING DEVICE

(71) Applicant: Ford Global Technologies, LLC, Dearborn, MI (US)

(72) Inventors: Baitao Xiao, Canton, MI (US); David Bell, Plymouth, MI (US); Julia Helen Buckland, Commerce Township, MI (US); Timothy Stolzenfeld, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/683,431

(22) Filed: Aug. 22, 2017

(51) Int. Cl.
| | |
|---|---|
| *F02M 35/09* | (2006.01) |
| *F02D 41/22* | (2006.01) |
| *F02D 41/26* | (2006.01) |
| *F02B 37/18* | (2006.01) |
| *F02B 37/24* | (2006.01) |
| *F02M 26/05* | (2016.01) |
| *F02M 35/024* | (2006.01) |
| *F02B 39/10* | (2006.01) |

(52) U.S. Cl.
CPC ........... *F02M 35/09* (2013.01); *F02B 37/183* (2013.01); *F02B 37/24* (2013.01); *F02B 39/10* (2013.01); *F02D 41/22* (2013.01); *F02D 41/26* (2013.01); *F02M 26/05* (2016.02); *F02M 35/024* (2013.01)

(58) Field of Classification Search
CPC .... F02M 35/00; F02M 35/02; F02M 35/0205; F02M 35/0207; F02M 35/0208; F02M 35/08; F02M 35/09; F02D 41/22; F02D 2041/228

USPC ............ 123/568.11, 568.17, 568.21, 198 D, 123/198 E, 559.1; 701/108, 114; 60/605.2; 73/114.31, 114.33

See application file for complete search history.

(56) References Cited

U.S. PATENT DOCUMENTS

| | | | |
|---|---|---|---|
| 5,606,311 A | 2/1997 | Polidan et al. | |
| 6,688,104 B2 | 2/2004 | Baeuerle et al. | |
| 6,705,084 B2 | 3/2004 | Allen et al. | |
| 6,735,945 B1 | 5/2004 | Hall et al. | |
| 7,444,234 B2 * | 10/2008 | Bauerle | F02M 35/09 123/361 |
| 7,779,634 B2 | 8/2010 | Barthelet et al. | |
| 8,327,695 B2 * | 12/2012 | Jackson | G01M 15/09 73/114.37 |
| 8,371,121 B2 | 2/2013 | Godeke et al. | |
| 8,516,797 B2 * | 8/2013 | Van Nieuwstadt | F01N 3/0238 60/280 |
| 8,573,040 B2 * | 11/2013 | Guzman | F02M 35/024 73/114.31 |
| 8,959,910 B2 | 2/2015 | Rollinger | |
| 2011/0308308 A1 * | 12/2011 | Herman | F02M 35/09 73/114.31 |
| 2017/0096974 A1 * | 4/2017 | Dudar | F02M 35/09 |

* cited by examiner

*Primary Examiner* — Lindsay Low
*Assistant Examiner* — Robert Werner
(74) *Attorney, Agent, or Firm* — Julia Voutyras; McCoy Russell LLP

(57) ABSTRACT

Methods and systems are provided for diagnosing an air filter for a vehicle. In one example, a method may include actuating a motor to flow air through the air filter during engine off, and indicating air filter replacement based on an air pressure measurement while actuating the motor.

20 Claims, 7 Drawing Sheets

US 10,100,790 B1

DIAGNOSING AN AIR FILTER WITH AN ELECTRIC BOOSTING DEVICE

FIELD

The present description relates generally to methods and systems for diagnosing an intake air filter in a vehicle system by operating an electric boosting device during engine off condition.

BACKGROUND/SUMMARY

Air filters are used in vehicles to provide clean air for induction into the engine system. Air filter may become clogged due to accumulation of dirt and debris. Clogged air filter may increase the intake air pressure drop and restrict air flow into the engine. The restriction of air flow may affect engine performance and efficiency. In order to replace or clean the clogged air filter, a status of the air filter can be regularly diagnosed, and indicated to the operator.

Attempts for diagnosing air filter status include diagnosing the air filter based on a pressure drop across the filter. One example approach is shown by Pago et al. in U.S. Pat. No. 5,606,311. Therein, pressure drop across the air filter and corresponding air flow are measured during engine operation, filter restriction is then estimated by comparing the measured pressure drop to a referenced pressure drop.

However, the inventors herein have recognized potential issues with such approach. As one example, air filter diagnosis based on a pressure drop during engine operation may not be accurate due to low signal to noise ratio. Specifically, the signal amplitude of the pressure drop may be low, as the pressure drop may not be significant relative to the sensor sensitivity even for a clogged filter depending on the operating conditions of the vehicle. Further, the reciprocating operation of the engine may introduce high noise. As a result, Pago's method may generate false positive results, which may alert the driver that the air filter requires replacement before it is necessary. Moreover, in hybrid vehicles, engine running time may be limited. Diagnosing air filter status during engine operation may not be frequent enough to identify air filter clogging. Additional, the duration of stable engine operation in a hybrid vehicle may not be long enough to obtain reliable pressure measurements.

In one example, the issues described above may be addressed by a method comprising: during engine off, opening a high pressure exhaust recirculation (HP-EGR) valve; flowing air through an air filter by actuating a motor coupled to a compressor; sensing an air pressure; and indicating status of the air filter based on the air pressure. In this way, air filter clogging may be timely and robustly detected.

As one example, in an engine system equipped with an electric boosted device, during engine off, a motor coupled to the electric boosted device may be operated to flow ambient air into the engine system through the intake air filter. One or more valves, such as a HP-EGR valve, may be opened to flow the air further from the air filter, bypassing the cylinder, to an exhaust passage. Air filter status may be diagnosed based on pressure measurement related to the air flow through the air filter. As one example, the pressure may be a pressure drop across the air filter. As another example, the pressure may be a pressure downstream of the air filter, in the direction of the air flow. By flowing the air from the filter to the exhaust passage bypassing the cylinder, the air may flow through the engine system with little resistance. As such, the pressure measurement may accurately reflect flow restriction caused by air filter clogging. Possible interferences caused by other components of the vehicle system on the measurement may be avoided. Further, the duration for conducting the air filter diagnosis may be reduced, as the air flow may be fully controlled and quickly stabilized via operating the electric boost device. By diagnosing the air filter during engine off, the air filter status may be frequently checked during automatic engine stop-start, avoiding noises introduced by the reciprocating engine operation. Moreover, by utilizing the motor coupled to the electric boosting device for air filter diagnosis, the diagnosis may be performed with existing engine components.

As another example, during a first condition, a first air pressure may be measured while flowing air in a first direction from the atmosphere to the compressor through the air filter. Subsequently, a second air pressure may be measured while flowing the air in a second direction, opposite to the first direction, from the compressor to the atmosphere through the air filter. The air filter may be diagnosed based on the first and the second air pressures. By flowing the air in a reversed direction, the air filter may be diagnosed when the HP-EGR valve is not present in the engine system. In one embodiment, the first condition may be during engine operation, and the second condition may be during engine off. The motor may be actuated to flow the air through the air filter in a second direction during engine off, responsive to the first air pressure measured during the engine operation. For example, the first air pressure may indicate the possibility of air filter clogging, and further diagnosis during engine off may increase accuracy of the diagnosis.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2:
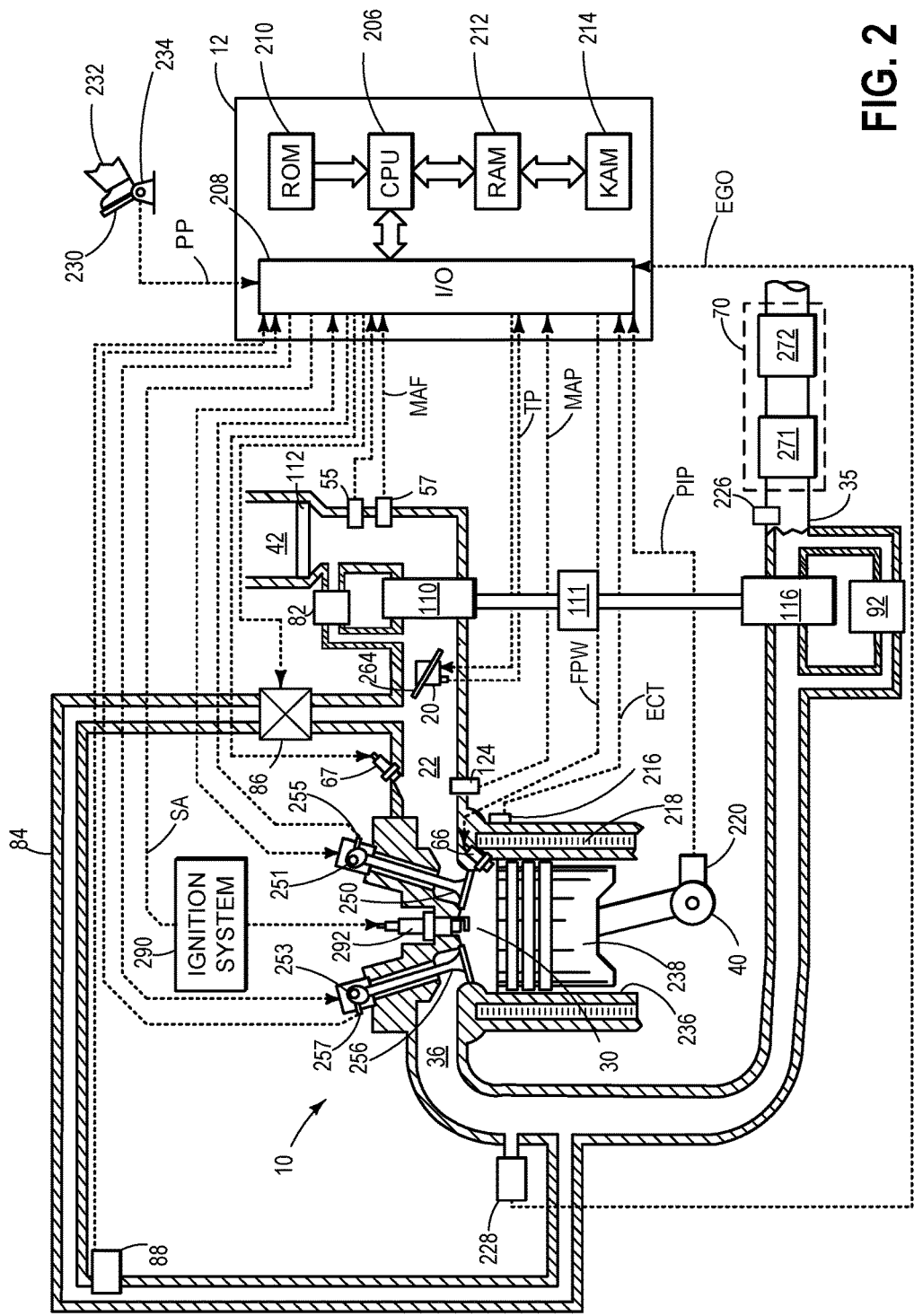
FIG. 2 shows a diagram of an example embodiment of one cylinder of an engine of FIG. 1.
Figure 3:
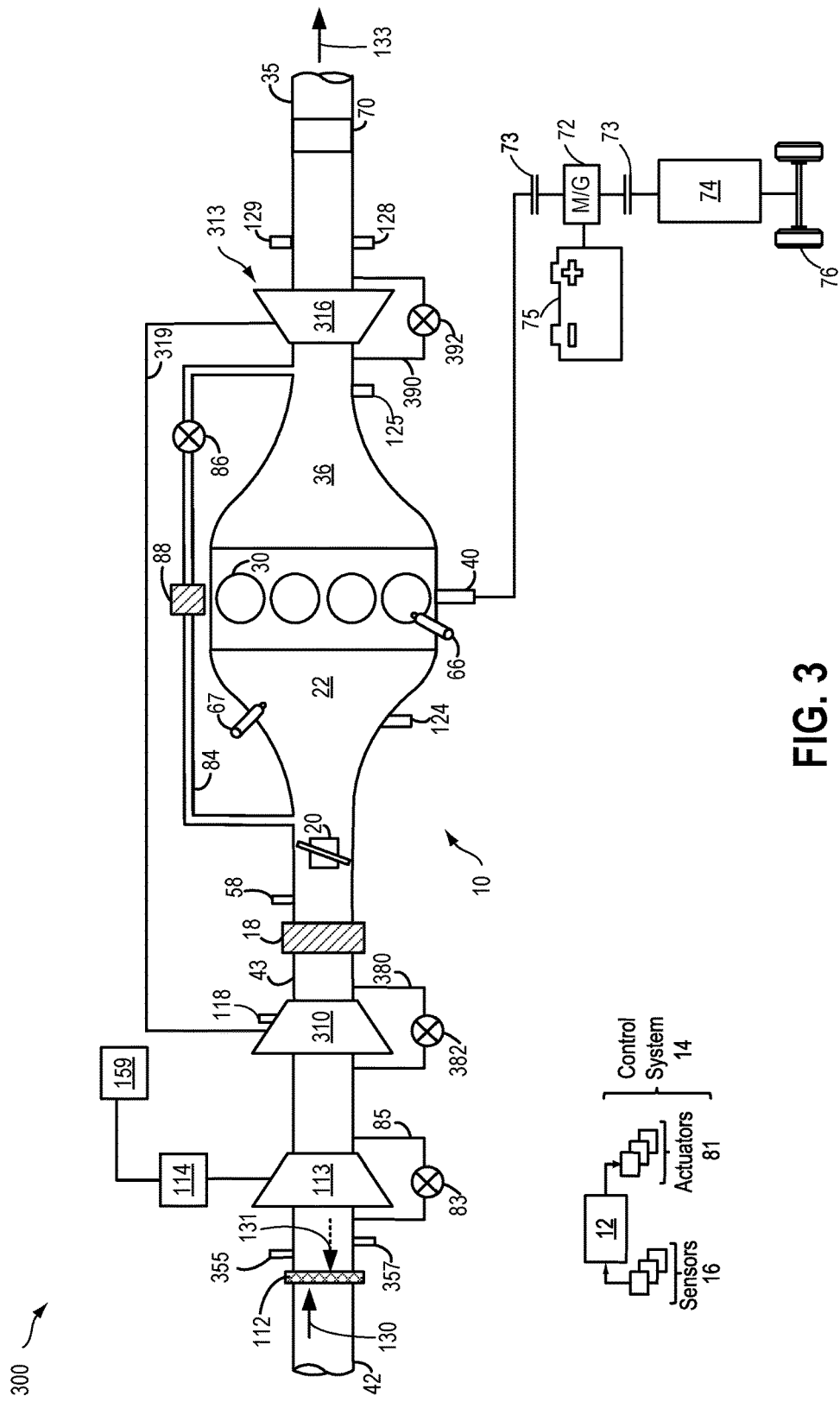
FIG. 3 shows another example embodiment of a vehicle system including an electric boosting device.
Figure 4:
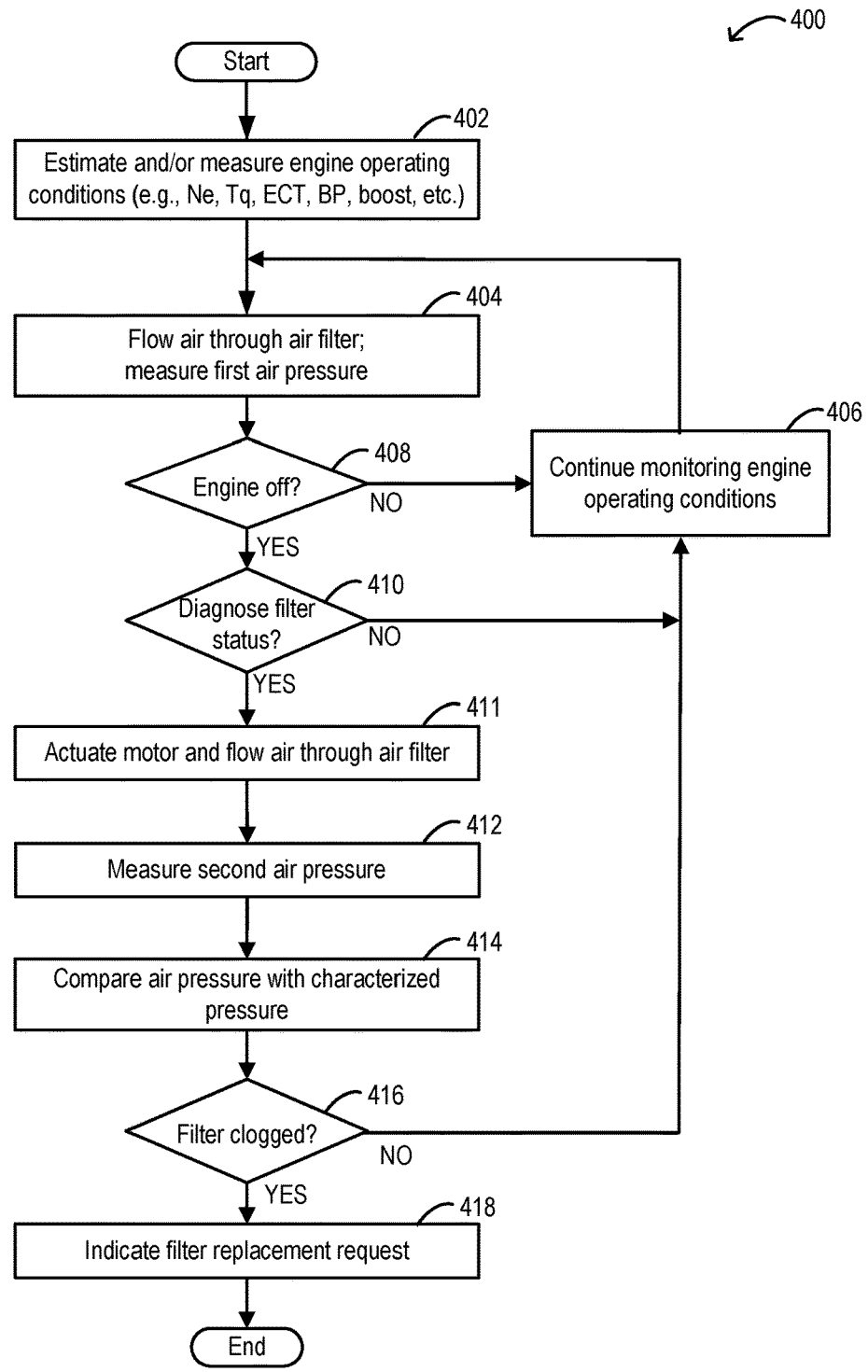
FIG. 4 shows an example method for diagnosing an intake air filter.
Figure 5:
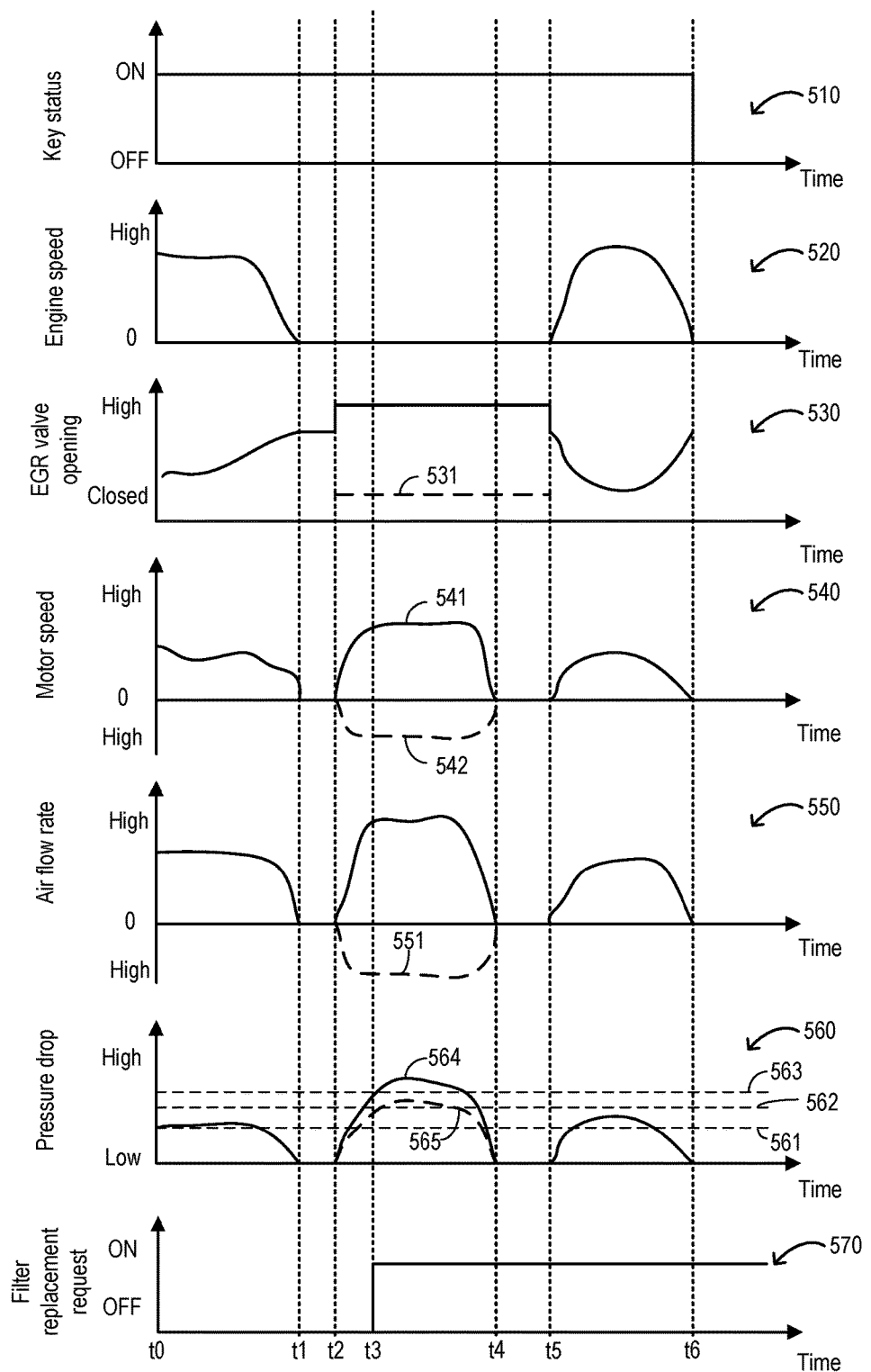
FIG. 5 shows status of engine actuators and operating parameters over time while implementing the method of FIG. 4.
Figure 6:
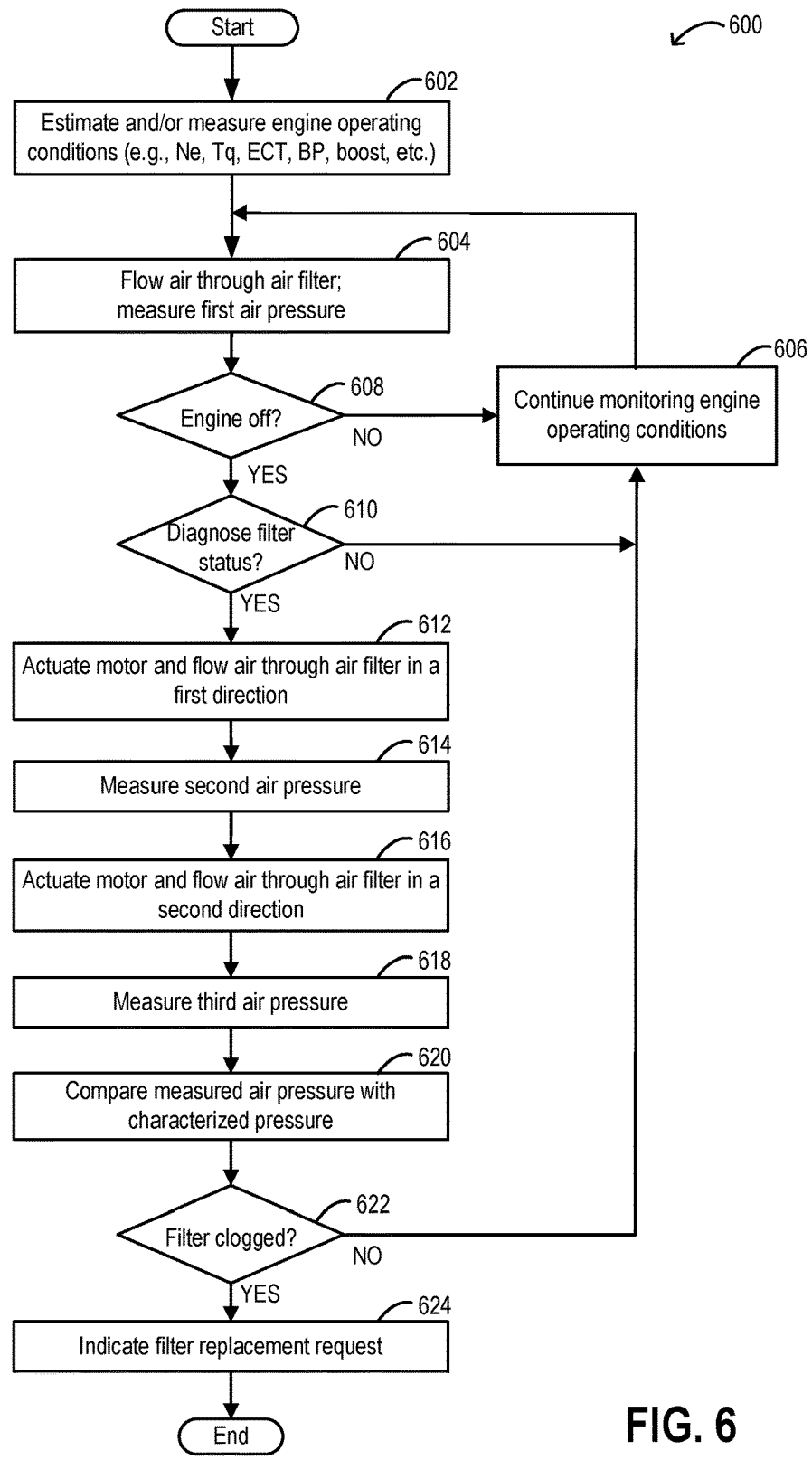
FIG. 6 shows another example method for diagnosing the intake air filter.
Figure 7:
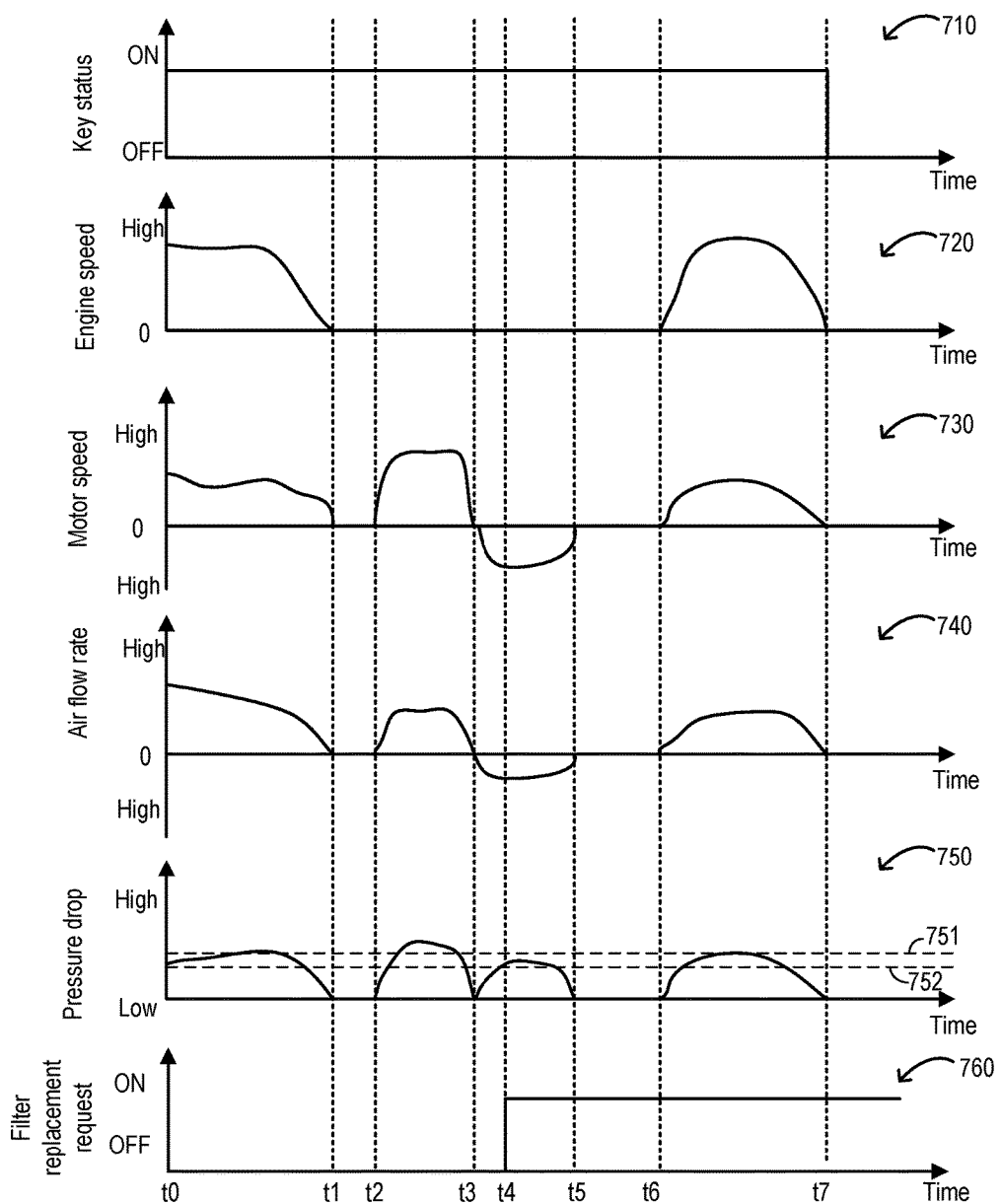
FIG. 7 shows status of engine actuators and operating parameters over time while implementing the method of FIG. 6.

The following description relates to systems and methods for diagnosing status of an intake air filter of a vehicle system equipped with electric boosting device, such as a compressor. The electric boosting device may be an electric boosted turbocharger, such as shown in an example embodiment of the vehicle system in FIG. 1. The electric boosting device may alternatively be an electric supercharger, shown in another example vehicle system in FIG. 3. FIG. 2 shows example components of an engine of FIG. 1. The air filter may be diagnosed based on air pressure measurements during engine off while actuating a motor coupled to the electric boosting device to flow air through the air filter. An example method for filter diagnosis is shown in FIG. 4, wherein the ambient air flows through the air filter into the engine system during engine off. Another example method for filter diagnosis is shown in FIG. 6, wherein the air flows in opposite directions through the air filter during engine off. FIG. 5 and FIG. 7 illustrate variation of actuator status and operating parameters while implementing the methods of FIG. 4 and FIG. 6, respectively.

Figure 1:
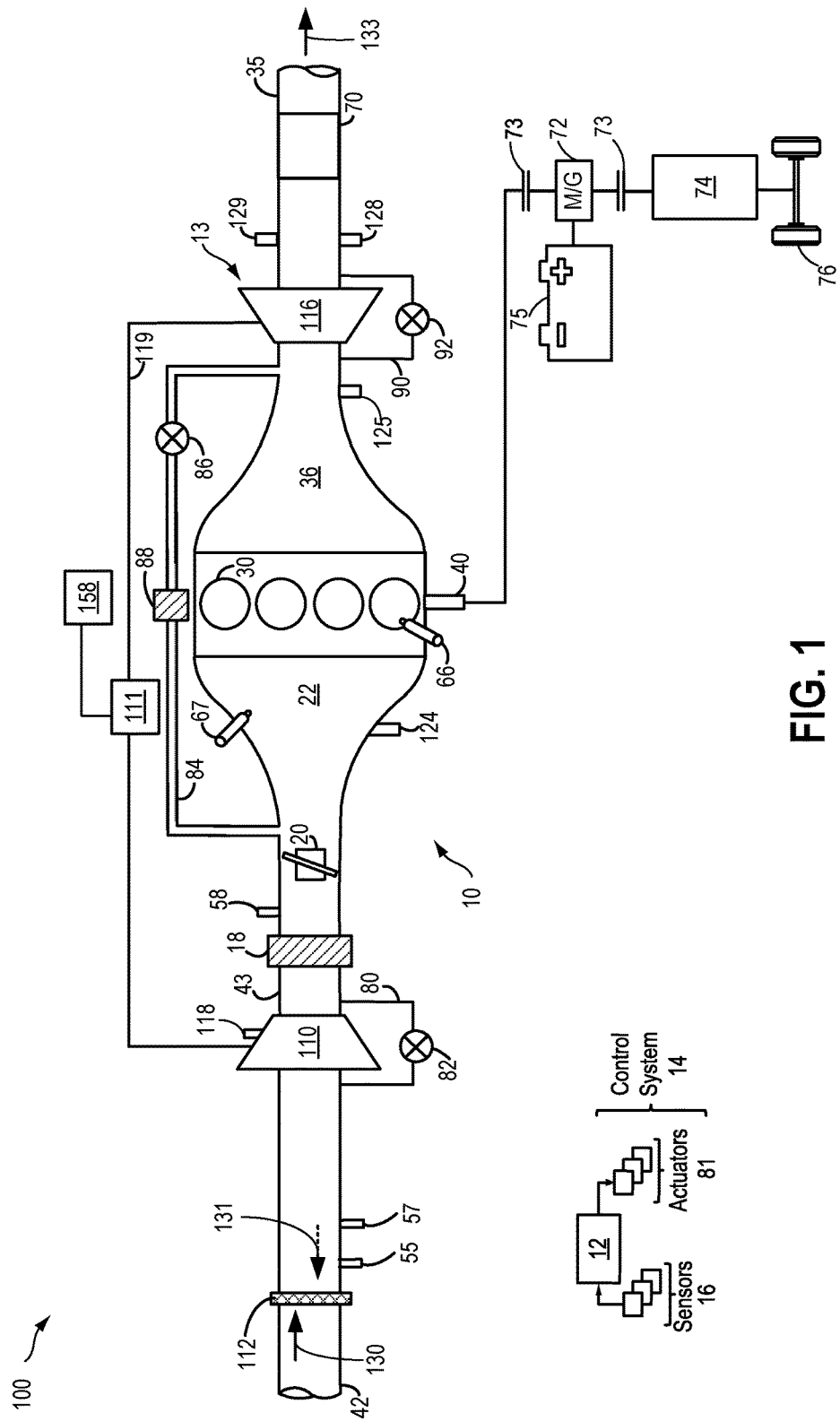
FIG. 1 shows an example embodiment of a vehicle system including an electric boosting device.

Turning now to FIG. 1, an example embodiment of a vehicle system 100 is illustrated schematically. In one example, vehicle system 100 may be configured as an on-road motor vehicle. However, it will be appreciated that in other examples vehicle system 100 may be configured as an off-road vehicle. In some examples, vehicle system 100 may be a hybrid vehicle with multiple sources of torque available to one or more vehicle wheels 76. In other examples, vehicle system 100 is a conventional vehicle with only an engine. In the example shown, vehicle system 100 includes engine 10 and an electric machine 72. Electric machine 72 may be a motor or a motor/generator. Crankshaft 40 of engine 10 and electric machine 72 are connected via a transmission 74 to vehicle wheels 76 when one or more clutches 73 are engaged. In the depicted example, a first clutch 73 is provided between crankshaft 40 and electric machine 72, and a second clutch 73 is provided between electric machine 72 and transmission 74. Controller 12, discussed herein, may send a signal to an actuator of each clutch 73 to engage or disengage the clutch, so as to connect or disconnect crankshaft 40 from electric machine 72 and the components connected thereto, and/or connect or disconnect electric machine 72 from transmission 74 and the components connected thereto. Transmission 74 may be a gearbox, a planetary gear system, or another type of transmission. The powertrain may be configured in various manners including as a parallel, a series, or a series-parallel hybrid vehicle.

Electric machine 72 receives electrical power from a traction battery 75 to provide torque to vehicle wheels 76. Electric machine 72 may also be operated as a generator to provide electrical power to charge battery 75, for example during a braking operation. In other examples, where vehicle system 100 is a conventional vehicle with only an engine, traction battery 75 may be a starting-lighting-ignition (e.g., SLI) battery that supplies electrical energy to the vehicle system 100.

Engine 10 may be a turbocharged engine including a turbocharger 13. Turbocharger 13 comprises a turbine 116 positioned in the exhaust passage 35 coupled to a compressor 110 positioned in the intake passage 42. Compressor 110 is shown mechanically coupled to turbine 116 via a shaft 119. Turbine 116 is driven by expanding engine exhaust. In the depicted example, turbocharger 13 is an electric turbocharger including an electric motor 111 for providing an electric assist to the turbocharger output. Battery 158 is coupled to the electric motor 111 for supplying power. In one example, the electric motor 111 may be coupled to the compressor via shaft 119. However in other examples, the electric motor may be directly coupled to the compressor or the turbine. By adjusting an output of the electric motor 111, an amount of compressed air delivered by the compressor may be adjusted. In one example, the compressor and turbine may be coupled within a twin scroll turbocharger. In another example, the turbocharger may be a variable geometry turbocharger (VGT), where turbine geometry is actively varied as a function of engine speed and other operating conditions. In yet another example, geometry of compressor 110 may be adjusted by operating compressor actuator 118. For example, compressor 110 may be a variable geometry compressor (VGC) having vanes that are moved in accordance with a desired vane angle to guide intake air flow into the compressor in different patterns.

During engine operation (engine speed greater than zero), engine 10 receives ambient air along intake passage 42 via an air filter 112, as indicated by arrow 130. The air is compressed by the compressor 110 of turbocharger 13 and delivered to induction passage 43. The compressed air passes through the induction passage 43, through the charge air cooler (CAC) 18 to cool, and through the throttle 20 before entering the intake manifold 22, where it enters the engine 10. In other words, compressor 110 is coupled through CAC 18 to intake throttle 20 and intake throttle 20 is coupled upstream of intake manifold 22. The charge-air cooler may be an air-to-air or water-to-air heat exchanger, for example. In the embodiment shown in FIG. 1, the pressure of the air charge within the intake manifold is sensed by a manifold air pressure (MAP) sensor 124.

It will be appreciated that other combinations and configurations of boosting devices may be possible. In one embodiment, engine system 100 may comprise a supercharger wherein compressor 110 may be at least partially driven by an electric machine and/or the engine 10, and the engine system may not include turbine 116. In still further examples, multiple boosting devices may be staged in series, such as shown in FIG. 3, wherein both a supercharger and a turbocharger are coupled to the intake passage.

Compressor 110 may include a recirculation passage 80 across the compressor. The depicted example shows a compressor recirculation valve (CRV) 82 coupled across the recirculation passage 80, where actuation of the CRV 82 adjusts the flow through the recirculation passage 80. Warm, compressed air from the compressor outlet may be recirculated back to the compressor inlet via recirculation passage 80. In some embodiments, the compressor recirculation system may alternatively, or additionally, include a recirculation passage for recirculating (cooled) compressed air from the compressor outlet, downstream of the charge air cooler to the compressor inlet or a compressor bypass for dissipating compressed air to atmosphere (not shown). The CRV 82 may be a continuously variable valve wherein a position of the valve is continuously variable from a fully closed position to a fully open position. In some embodiments, compressor recirculation valve 82 may be held partially open during boosted engine operation to provide some surge margin. Herein, the partially open position may be a default valve position. Increasing the opening of the compressor recirculation valve may include actuating (or energizing) a solenoid of the valve. Further discussion of example CRV operation will be discussed herein.

One or more sensors may be coupled to an inlet of the compressor 110 for determining a composition and condition of air charge entering the compressor. For example, a pressure sensor 55 may be coupled between the air filter 112 and the compressor inlet for estimating a pressure of air charge entering the compressor. In another example, a mass airflow (MAF) sensor 57 may also be coupled to the inlet of the compressor for estimating the amount of air entering the engine. Still other sensors may include, for example, air-fuel ratio sensors, humidity sensors, etc. In other examples, one or more of the compressor inlet conditions (such as humidity, temperature, etc.) may be inferred based on engine operating conditions. The sensors may estimate a condition of the intake air received at the compressor inlet from the intake passage as well as the air charge recirculated from upstream of the CAC. A throttle inlet pressure (TIP) sensor 58 or other suitable sensor, may be coupled downstream of the compressor 110 and upstream of the throttle 20, for measuring the boost pressure at a location downstream of the compressor 110 and upstream of the throttle 20. In this way, a compressor outlet pressure may be determined. Compressor pressure ratio may be calculated by dividing the compressor outlet pressure with compressor inlet pressure (such as pressure measured by sensor 55).

Intake manifold 22 is coupled to a series of combustion chambers 30 through a series of intake valves (described further with reference to FIG. 2). The combustion chambers are further coupled to exhaust manifold 36 via a series of exhaust valves (described further with reference to FIG. 2). In the depicted embodiment, a single exhaust manifold 36 is shown. However, in other embodiments, exhaust manifold 36 may include a plurality of exhaust manifold sections. Configurations having a plurality of exhaust manifold sections may enable effluent from different combustion chambers to be directed to different locations in the engine system 10. Sensor 125 may be coupled to the exhaust manifold for measuring exhaust pressure.

Combustion chambers 30 may be supplied by a fuel system with one or more fuels, such as gasoline, alcohol fuel blends, diesel, biodiesel, compressed natural gas, etc. Fuel may be supplied to the combustion chambers via direct injection, port injection, throttle valve-body injection, or any combination thereof. Direct injection comprises injecting the fuel directly into the combustion chamber, and port injection delivers the fuel spray into the intake ports where it mixes with the intake air before entering the combustion chamber. The present example may include a plurality of direct fuel injectors 66 and port fuel injectors 67. In the combustion chambers, combustion may be initiated via spark ignition and/or compression ignition.

As shown in FIG. 1, exhaust gas from the one or more sections of exhaust manifold 36 is directed to turbine 116 to drive the turbine. When reduced turbine torque is desired, some exhaust may be directed instead through waste-gate 90, bypassing the turbine 116. Waste-gate valve 92, coupled to waste-gate 90, may be actuated open to dump at least some exhaust pressure from upstream of the turbine 116 to a location downstream of the turbine via waste-gate 90. By reducing exhaust pressure upstream of the turbine 116, turbine speed may be reduced. In one embodiment, waste-gate valve 92 may be vacuum actuated, that is, it may be actuated via the application of vacuum. The combined flow from the turbine 116 and the waste-gate 90 then flows through emission control device 70 (described further with reference to FIG. 2) before all or part of the treated exhaust may be released into the atmosphere via exhaust passage 35, as indicated by arrow 133.

Engine 10 may further include one or more exhaust gas recirculation (EGR) passages for recirculating a portion of exhaust gas from the exhaust manifold to the intake manifold. By recirculating some exhaust gas, an engine dilution may be affected which may improve engine performance by reducing engine knock, peak cylinder combustion temperatures and pressures, throttling losses, and NOx emissions. In the depicted example, exhaust gas may be recirculated from exhaust manifold 36, upstream of turbine 116, to intake manifold 22, downstream of compressor 110 and throttle 20 via high pressure EGR passage 84. This configuration may be known as a high pressure (HP) EGR system. EGR passage 84 may include an HP-EGR valve 86 for controlling HP-EGR flow and an EGR cooler for cooling exhaust gas prior to delivery in the intake manifold. In still further examples, exhaust gas may be recirculated from exhaust passage 35, downstream of turbine 116, to intake passage 42, upstream of compressor 110, via a low pressure EGR passage (not shown). The amount of EGR provided to intake passage may be varied by controller 12 via HP-EGR valve 86.

Engine system 100 may further include control system 14 which includes controller 12. Controller 12 is shown receiving information from a plurality of sensors 16 (various examples of which are described herein) and sending control signals to a plurality of actuators 81 (various examples of which are described herein). As one example, sensors 16 may include MAP sensor 124, exhaust pressure sensor 125, exhaust temperature sensor 128, exhaust pressure sensor 129, compressor inlet pressure sensor 55, manifold air flow sensor 57, and throttle inlet pressure sensor 58. Other sensors such as additional pressure, temperature, air/fuel ratio, and composition sensors may be coupled to various locations in engine system 10. The actuators 81 may include, for example, motor 111, throttle 20, compressor recirculation valve 82, waste-gate valve 92, HP-EGR valve 86, direct fuel injector 66, and port fuel injector 67.

Turning now to FIG. 2, an example embodiment of a combustion chamber (e.g., cylinder) of an internal combustion engine (such as engine 10 of FIG. 1) is shown. Components previously introduced in FIG. 1 may be similarly numbered. Engine 10 may receive control parameters from a control system including controller 12 and input from a vehicle operator 230 via an input device 232. In this example, input device 232 includes an accelerator pedal and a pedal position sensor 234 for generating a proportional pedal position signal PP. Cylinder (herein also "combustion chamber") 30 of engine 10 may include combustion chamber walls 236 with piston 238 positioned therein. Piston 238 may be coupled to crankshaft 40 so that reciprocating motion of the piston is translated into rotational motion of the crankshaft. Crankshaft 40 may be coupled to at least one drive wheel of the vehicle system via a transmission system.

Cylinder 30 can receive intake air via intake passage 42, induction passage 43, and intake manifold 22. Intake manifold 22 may communicate with other cylinders of engine 10 in addition to cylinder 30. In some embodiments, one or more of the intake passages may include a boosting device such as a turbocharger or a supercharger. For example, FIG. 2 shows engine 10 configured with turbocharger 13 including compressor 110 arranged between intake passage 42 and induction passage 43, and an exhaust turbine 116 arranged between exhaust manifold 36 and exhaust passage 35. Compressor 110 may be at least partially powered by exhaust turbine 116 via shaft 119 where the boosting device is configured as a turbocharger. Compressor may also be powered by motor 111. As previously described, in examples where engine 10 is provided with a supercharger, exhaust turbine 116 may be optionally omitted, where compressor 110 may be powered by mechanical input from a motor or the engine 10. Throttle 20 may include a throttle plate 264, and may be provided along an intake passage of the engine for varying the flow rate and/or pressure of intake air provided to the engine cylinders. For example, throttle 20 may be disposed downstream of compressor 110.

Exhaust manifold 36 may receive exhaust gases from other cylinders of engine 10 in addition to cylinder 30. Exhaust gas sensor 228 is shown coupled to exhaust manifold 36 upstream of emission control device 70, but it will be appreciated that it may be located at other locations in the exhaust system. Exhaust gas sensor 228 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 70 may be a three way catalyst (TWC), NOx trap, various other emission control devices, or combinations thereof.

Each cylinder of engine 10 may include one or more intake valves and one or more exhaust valves. For example, cylinder 30 is shown including at least one poppet-style intake valve 250 and at least one poppet-style exhaust valve 256 located at an upper region of cylinder 30. In some embodiments, each cylinder of engine 10, including cylinder 30, may include at least two intake poppet valves and at least two exhaust poppet valves located at an upper region of the cylinder. Intake valve 250 may be controlled by controller 12 by cam actuation via cam actuation system 251. Similarly, exhaust valve 256 may be controlled by controller 12 via cam actuation system 253. Cam actuation systems 251 and 253 may each include one or more cams and may utilize one or more of cam profile switching (CPS), variable cam timing (VCT), variable valve timing (VVT), and/or variable valve lift (VVL) systems that may be operated by controller 12 to vary valve operation. Whether electronically actuated or cam actuated, the timing of exhaust and intake valve opening and closure may be adjusted as specified for desired combustion and emissions-control performance. The operation of intake valve 250 and exhaust valve 256 may be determined by valve position sensors (not shown) and/or camshaft position sensors 255 and 257, respectively. In alternative embodiments, the intake and/or exhaust valve may be controlled by electric valve actuation. For example, cylinder 30 may alternatively include an intake valve controlled via electric valve actuation and an exhaust valve controlled via cam actuation including CPS and/or VCT systems. Additionally, a VCT system may include one or more VCT devices (not shown) that may be actuated to adjust the timing of the intake and exhaust valves to a timing that provides decreased positive intake to exhaust valve overlap. That is to say, the intake and exhaust valves will be open for a shorter duration and will move away from being simultaneously open for a portion of the intake stroke. In still other embodiments, the intake and exhaust valves may be controlled by a common valve actuator or actuation system, or a variable valve timing actuator or actuation system.

In some embodiments, each cylinder of engine 10 may include a spark plug 292 for initiating combustion. Ignition system 290 may provide an ignition spark to cylinder 30 via spark plug 292 in response to spark advance signal SA from controller 12, under select operating modes. In other embodiments, compression-ignition engines may use a glow plug in place of spark plug 292.

In some embodiments, each cylinder of engine 10 may be configured with one or more injectors for delivering fuel to the cylinder 30. As a non-limiting example, cylinder 30 is shown including two fuel injectors 66 and 67. Fuel injectors 66 and 67 may be configured to deliver fuel received from fuel system (not shown) via a high pressure fuel pump, and a fuel rail. Alternatively, fuel may be delivered by a single stage fuel pump at lower pressure, in which case the timing of the direct fuel injection may be more limited during the compression stroke than if a high pressure fuel system is used. Further, the fuel tank may have a pressure transducer providing a signal to controller 12.

Fuel injector 66 is shown coupled directly to cylinder 30 for injecting fuel directly therein in proportion to the pulse width of signal FPW-1 received from controller 12 via an electronic driver. In this manner, fuel injector 66 provides what is known as direct injection (hereafter referred to as "DI") of fuel into combustion cylinder 30. While FIG. 2 shows injector 66 positioned to one side of cylinder 30, it may alternatively be located overhead of the piston, such as near the position of spark plug 292. Such a position may improve mixing and combustion when operating the engine with an alcohol-based fuel due to the lower volatility of some alcohol-based fuels. Alternatively, the injector may be located overhead and near the intake valve to improve mixing.

Fuel injector 67 is shown arranged in intake manifold 22, rather than in cylinder 30, in a configuration that provides what is known as port injection of fuel (hereafter referred to as "PFI") into the intake port upstream of cylinder 30. Fuel injector 67 may inject fuel, received from fuel system 288, in proportion to the pulse width of signal FPW-2 received from controller 12 via an electronic driver.

Fuel may be delivered by both injectors to the cylinder during a single cycle of the cylinder. For example, each injector may deliver a portion of a total fuel injection that is combusted in cylinder 30. As such, even for a single combustion event, injected fuel may be injected at different timings from the port and direct injector. Furthermore, for a single combustion event, multiple injections of the delivered fuel may be performed per cycle. The multiple injections may be performed during the compression stroke, intake stroke, or any appropriate combination thereof.

As described above, FIG. 2 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 2 with reference to cylinder 30.

The engine may further include one or more exhaust gas recirculation passages for recirculating a portion of exhaust gas from the engine exhaust to the engine intake. In the depicted embodiment, exhaust gas may be recirculated from exhaust manifold 36 to intake manifold 22 via HP-EGR passage 84. Further, an EGR sensor 88 may be arranged within the HP-EGR passage 84 and may provide an indication of one or more of pressure, temperature, and concentration of the exhaust gas. Other non-limiting example EGR configurations may include LP-EGR.

Exhaust gas sensor 226 is shown coupled to exhaust passage 35 downstream of turbine 116. Sensor 226 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a $NO_x$, HC, or CO sensor.

Emission control device 70 may be arranged along exhaust passage 35 downstream of exhaust gas sensor 226 and the turbine. In the depicted example, emission control device may include devices 271 and 272, wherein device 271 may be a gas particulate filter, and device 272 may be a three way catalyst.

Controller 12 is shown as a microcomputer, including microprocessor unit 206, input/output ports 208, an electronic storage medium for executable programs and calibration values shown as read-only memory chip 210 in this particular example, random access memory 212, keep alive memory 214, and a data bus. Controller 12 may receive various signals from sensors coupled to engine 10, in addition to those signals previously discussed, including measurement of engine coolant temperature (ECT) from temperature sensor 216 coupled to cooling sleeve 218; a profile ignition pickup signal (PIP) from Hall effect sensor 220 (or other type) coupled to crankshaft 40; throttle position (TPS) from a throttle position sensor; and manifold absolute pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold. Still other sensors may include fuel level sensors and fuel composition sensors coupled to the fuel tank(s) of the fuel system.

Storage medium read-only memory chip 210 can be programmed with computer readable data representing instructions executable by microprocessor unit 206 for performing the methods described below as well as other variants that are anticipated but not specifically listed. The controller 12 may employ the actuators in response to the processed input data received from the various sensor based on instructions stored in the memory of the controller or code programmed therein corresponding to one or more routines, such as the example method 400 of FIG. 4 and method 600 of FIG. 6. As one example, controller 12 may determine engine speed based on Hall effect senor 220 outputs. In response to zero engine speed, controller 12 may actuate motor 111, HP-EGR valve 86, and waste-gate valve 92 to flow ambient air through the air filter to the exhaust passage 35.

FIG. 3 shows another example embodiment of a vehicle system 300. Components previously introduced in vehicle system 100 of FIG. 1 may be similarly numbered. Similar to vehicle system 100, vehicle system 300 comprises engine 10, HP-EGR passage 84 coupled to engine 10. Vehicle system 300 comprises a turbocharger 313. Turbocharger 313 includes compressor 310 driven by turbine 316 via shaft 319. CRV valve 382 and waste-gate valve 392 are coupled to compressor recirculation passage 380 and waste gate 390 respectively.

Vehicle system 300 may further include supercharger 113 for further boosting the charge air. Supercharger 113 is shown here coupled to the intake passage 42 between the air filter 112 and compressor 310. In another embodiment, supercharger 113 may be coupled between the compressor 310 and cylinder. Supercharger 113 may be an electric supercharger driven by motor 114 based on signals from controller 12. Battery 159 may be coupled to motor 114 for supplying electrical power to motor 114. Supercharger 113 may include a bypass passage 85 for flowing air between the air filter 112 and compressor 310 without passing through the supercharger. Air flow through the supercharger bypass passage 85 may be regulated by supercharger bypass valve 83. Sensor 355 and 357 may be coupled to the intake passage 42 between the air filter and the supercharger for measuring air pressure and air flow rate, respectively.

Turning to FIG. 4, method 400 shows an example method of diagnosing air filter status utilizing an electric boosting device during engine off. In one example, the electric boosting device may be an electrically assisted turbocharger, as shown in FIG. 1. In another example, the electric boosting device may be an electric supercharger coupled to a turbocharger, as shown in FIG. 3. Instructions for carrying out method 400 and the rest of the methods included herein may be executed by a controller based on instructions stored on a memory of the controller and in conjunction with signals received from sensors of the engine system, such as the sensors described above with reference to FIGS. 1-3. The controller may employ engine actuators of the engine system to adjust engine operation, according to the methods described below.

At 402, method 400 estimates and/or measures engine operating conditions including, but not limited to, engine speed, fuel amount, fuel pressure, operator torque demand, engine coolant temperature (ECT), barometric pressure (BP), boost pressure, intake manifold pressure (boost pressure), exhaust manifold pressure, mass airflow rate (MAF), exhaust air flow rate, an accelerator pedal position (PP), EGR flow, and EGR rates as may be measured and/or estimated by the output of respective sensors described in reference to FIGS. 1-3.

At 404, air flows from the atmosphere to the engine through the air filter in a first direction during engine operation (shown as arrow 130 in FIG. 1 and FIG. 3). The air may be flowed by the vacuum generated by the operating engine. The air may also be flowed by the air charging device, such as a compressor. Step 404 may also include measuring a first air pressure related to the air flowing through the air filter. In one embodiment, the air pressure may be measured by a pressure sensor coupled downstream of the air filter (such as pressure sensor 55 of FIG. 1 and pressure sensor 355 of FIG. 3). In another embodiment, the air pressure may be a pressure difference or pressure drop across the air filter. In one example, the pressure drop may be sensed by a sensor. In another example, the pressure drop may be calculated by taking the absolute value of the difference between the pressure downstream of the air filter and the atmospheric pressure.

At 408, the controller checks if the engine is off. As an example, engine-off may be determined if the engine speed is zero, without piston movement. As another example, engine-off may be determined if no air enters the cylinder. As yet another example, engine-off may be determined if intake valves of the engine cylinder remain closed. If the engine is off, method 400 moves to 410. Otherwise, method 400 continues monitoring engine operating conditions at 406.

At 410, the controller determines whether to diagnose air filter status. In one embodiment, the controller may determine whether to diagnose air filter status responsive to air pressure measurement during engine operation at 404. For example, responsive to the pressure drop across the air filter greater than a threshold pressure during engine operation, the controller may determine to further diagnose the air filter during engine off. The threshold pressure may be predetermined by operating or modeling a model engine system.

In another embodiment, the air filter status may be diagnosed after predetermined time duration since last diagnosis or the most recent filter replacement. The air filter status may alternatively be diagnosed at predetermined time points after filter replacement. In one example, the time duration or predetermined time points may be adjusted by engine operating conditions, such as whether and/or road conditions, etc. For example, the air filter may be diagnosed more frequently responsive to extensive engine operation in rural areas.

If the controller determines to diagnose the air filter, method 400 moves to 411. Otherwise, method 400 continues monitoring engine operating conditions at 406.

At 411, the controller actuates the motor coupled to the electric boosting device to flow air through the air filter. In one embodiment, the engine system includes HP-EGR. The motor may be actuated to flow air in the first direction, from the atmosphere to the engine cylinder through the air filter, as shown as arrow 130 in FIG. 1 and FIG. 3. The HP-EGR valve is opened to allow air flow from the air filter to the exhaust passage, bypassing engine cylinder. One or more other valves, such as the waste gate valve (92 of FIGS. 1 and 392 of FIG. 3) and the CRV valve (382 of FIG. 3), may be opened to allow air flow from the air filter to the exhaust passage bypassing the turbine and/or the compressor to reduce restriction to the air flow. Additionally, supercharger bypass valve (such as valve 83 of FIG. 3) may be closed. In another example, geometry of the compressor 310 may be adjusted to allow air flow through the compressor with little flow restriction. In another embodiment, in an engine system without HP-EGR, the motor may be actuated to flow air through the air filter in a reversed direction from the compressor to the atmosphere (shown as arrow 131 in FIG. 1 and FIG. 3), which is opposite to the air flow direction during engine operation.

A speed of the motor may be set based on operating conditions, such as ambient pressure, and ambient temperature to obtain increased repeatability when averaging a pressure across multiple engine off events in order to better determine the filter loading status. For example, the motor may be set to a desired speed, the speed determined at each engine off condition based on ambient pressure and temperature, and possibly further based on underhood temperature if drawing underhood air to the intake (as the mass flow and thus resistance can be affected by air density). Further, the speed may be set based on a flow path of the gasses in the engine system, e.g., based on a position of an EGR valve and account for the flow resistance variations caused by the different valve positions in order to have a more repeatable pressure drop for a given filter resistance.

At 412, during motor actuation, a second air pressure related to the air flow through the air filter may be measured. The air pressure may be measured in the same approach as in 404. Specifically, the air pressure may be an air pressure measured by the sensor coupled between the air filter and the compressor of an electric assisted turbocharger or of an electric supercharger (such as sensor 55 of FIG. 1 and sensor 355 of FIG. 3). Alternatively, the pressure drop across the air filter may be measured.

At 414, the first and the second measured air pressure is compared with a characterized air pressure to determine air filter clogging. As one example, the characterized air pressure may be a threshold air pressure calibrated by operating or modeling a model engine system. As another example, the characterized air pressure may be a pressure profile calibrated by operating or modeling the model engine system. In one embodiment, filter clogging may be determined by comparing the second air pressure with the characterized air pressure. In another embodiment, both the first and the second air pressures may be used for determining filter clogging. For example, a weighted sum of the first and second air pressures may be calculated before being compared to the characterized air pressure. The first and the second air pressures may be weighted by difference weighting factors. In one example, the weighting factor of the second air pressure may be higher than the weighting factor of the first air pressure. In another example, the weighting factor for the first air pressure may be zero.

At 416, the controller determines if the filter is clogged based on the comparison at 414. As an example, the controller may determine that the air filter is clogged if the pressure drop during engine off across the air filter is greater than a threshold. As another example, the controller may determine that the air filter is clogged if the pressure drop during engine operation is greater than a first threshold, and the pressure drop during engine off is greater than a second threshold. If the filter is not clogged, method 400 returns to 406 to continue monitoring engine operating status. If the filter is clogged, method 400 moves to 418. Otherwise, method 400 continues monitoring engine operating conditions at 406.

At 418, filter clogging is indicated. A filter replacement request may be sent to the vehicle operator. For example, the controller may turn on an indicator on the dash panel to indicate the operator. Further, registers in the controller may be set to record the status of the filter.

FIG. 5 illustrates the status of multiple actuators and engine operating parameters over time while implementing method 400 of FIG. 4. Plot 510 shows status of the vehicle key. The key may be on or off as indicated by the y-axis. Plot 520 shows engine speed. The engine speed increases as indicated by the arrow of the y-axis. Plot 530 shows opening angle of the EGR valve. The degree of opening increases as indicated by the y-axis. Plot 540 shows speed of the electric motor coupled to the compressor. The motor speed may be positive or negative, driving the air flow in opposite directions through the air filter. As an example, when the motor speed is positive, air flow rate 550 through the air filter is positive, and air flows in a first direction from atmosphere to the compressor through the air filter (shown as 130 in FIG. 1 and FIG. 3). When the motor speed is negative, air flow rate 550 is negative, and air flows in a second direction from the compressor to the atmosphere through the air filter (shown as 131 in FIG. 1 and FIG. 3). Plot 560 shows pressure drop across the air filter. The pressure drop is the absolute value of the pressure difference across the air filter. The pressure drop increases as indicated by the arrow of the y-axis. Plot 570 shows the air filter replacement request. The air filter replacement request may be on or off.

From t0 to t1, the vehicle key is on. The engine is operating with non-zero engine speed. The EGR valve may be actuated based on parameters including engine speed. For example, EGR valve opening increases with decreased engine speed. Motor speed 540 is adjusted based on parameters such as charge air demand. Air flow rate 550 through the air filter is in a first direction. The pressure drop 560 across the filter varies responsive to the air flow rate.

At t1, the engine is off with zero engine speed. The motor speed and air flow rate through the air filter into the engine are both zero. Pressure drop across the air filter is also zero, since no air flows through the filter. In one example, the motor speed may be set based on ambient pressure. As an example, the motor speed may be increased with decreased ambient pressure.

At t2, the controller determines to start diagnosing the air filter. As one example, the controller may determine to diagnose the filter responsive to pressure drop during t0-t1 higher than a threshold 561. Threshold 561 may be predetermined based on operating or modeling of a model engine system. The threshold may be further adjusted based on air flow rate. As another example, the controller may determine to diagnose the filter after a predetermined time duration.

In one embodiment, the motor speed 540 starts to increase from zero as shown by 541. The EGR valve is open to allow air flow from the air filter to the exhaust passage of the vehicle system. The pressure drop increases. At t3, responsive to pressure drop 564 higher than threshold 563, the filter replacement request 570 is on.

In another embodiment, at t2, the motor may be actuated to flow the air in a second direction from the engine to the atmosphere, through the filter. The motor speed increases negatively from zero as shown in 542. The air flow rate 551 also increases negatively from t2. The corresponding pressure drop due to the air flow in the second direction is shown in 565. The filter replacement request is turned on from off at t3, responsive to the pressure drop 565 higher than threshold 562. In one example, if the vehicle system includes HP-EGR passage, the HP-EGR valve may be closed with zero HP-EGR flow as shown in 531.

At t4, the air filter diagnosis ends. The motor speed and air flow rate return to zero. Pressure drop is also zero. From t2 to t4, while the motor speed is nonzero, the EGR valve remains wide open.

At t5, engine speed increases from zero. The EGR valve opening and motor speed are adjusted based on engine operating parameters. Air flow rate 550 and the pressure drop 560 vary responsive to engine operating conditions.

At t6, engine speed is down to zero responsive to vehicle key-off. The motor speed decreases to zero. Pressure drop is zero responsive to zero air flow rate. The filter replacement request may remain on to indicate the request to the operator.

In another embodiment, air filter may be diagnosed based on air pressure measured during multiple distinct engine off periods separated by engine running conditions. The filter replacement request may be adjusted based on multiple of the measured air pressures. As an example, the filter status may be diagnosed by comparing an average of the measured air pressures during the multiple distinct engine off periods. As another example, the filter status may be diagnosed by comparing a weighted average of the measured air pressures during the multiple distinct engine off periods. The weighting factor may be determined based on air flow rate through the air filter. For example, the weighting factor may be increased with increased air flow rate. The air flow rate may be estimated based on ambient conditions and motor operating condition. For example, the air flow rate may be high during high ambient pressure and high motor speed.

FIG. 6 shows another example method 600 for diagnosing air filter status without operating the HP-EGR valve. Method 600 may be applied to a vehicle system with no HP-EGR passage. Method 600 operates the motor coupled to the electric boosting device to flow the air through the air filter in opposite directions during engine off, and detects air filter clogging based on air pressure measurement while operating the motor.

At 602, similar to 402 of FIG. 4, method 400 estimates and/or measures engine operating conditions including, but not limited to, engine speed, fuel amount, fuel pressure, operator torque demand, engine coolant temperature (ECT), barometric pressure (BP), boost pressure, intake manifold pressure (boost pressure), exhaust manifold pressure, mass airflow rate (MAF), exhaust air flow rate, an accelerator pedal position (PP), EGR flow, and EGR rates as may be measured and/or estimated by the output of respective sensors described in reference to FIGS. 1-3.

At 604, similar to 404 of FIG. 4, air flows through the air filter in the first direction, and the first air pressure is measured. The air pressure may be the air pressure between the air filter and the compressor or supercharger (such as pressure measured by sensor 55 of FIG. 1 or sensor 355 of FIG. 3). The air pressure may alternatively be pressure drop across the air filter.

At 608, similar to 408 of FIG. 4, method 600 determines whether the engine is off. If the engine is off, method 600 moves to 610. For example, the method may include the occurrence of the engine being off and without combustion at rest, and the engine being on with combustion and spinning. Otherwise, method 600 continues monitoring engine operation at 606.

At 610, similar to 410 of FIG. 4, method 600 determines whether to diagnose the air filter status. The controller may determine whether to diagnose the air filter status based on the first air pressure and/or a time duration since the last filter diagnosis. If the controller determines to diagnose the filter, method 600 moves to 612. Otherwise, method 600 continues monitoring engine operating conditions at 606.

At 612, the motor is actuated to flow the air through the air filter in a first direction (such as direction 130 shown in FIG. 1 and FIG. 3) to induct ambient air into the engine system.

At 614, the second air pressure related to the air flow in the first direction may be measured. The second air pressure may be measured by the same sensor as the first air pressure.

At 616, after flowing the air through the air filter in the first direction, actuating the motor and flow the air in a second direction, opposite to the first direction, from the compressor to the atmosphere through the air filter (as shown in 131 of FIG. 1 and FIG. 3). Further, while flowing the air in the second direction, the air filter may be cleaned by blowing some of the dirt and dust trapped in the air filter into a compartment of an airbox.

At 618, the third air pressure related to the air flow in the second direction may be measured. By flowing the air in the second direction after flowing the air in the first direction, air flow rate through the air filter may be increased to ensure high signal to noise ratio.

At 620, the measured air pressures are compared to characterized air pressure to determined filter status. As one example, the characterized air pressure may be threshold air pressures calibrated via operating or modeling a model engine system by flowing the air through the air filter. As another example, the characterized air pressure may be a pressure profile calibrated by operating or modeling the model engine system to flow the air through the air filter. In one embodiment, the third air pressure may be used to determine filter clogging. For example, the filter may be determined to be clogged if the third pressure drop higher than a threshold. In another embodiment, filter clogging may be determined based on both the second and the third air pressure measurement. As an example, the filter may be determined to be clogged if a weighted sum of the second and third air pressures is higher than a threshold. As another example, the weighting factor for the third air pressure may be higher than the weighting factor for the second air pressure. In yet another embodiment, filtering clogging may be determined based on a weighted sum of the first, second, and third air pressures.

At 622, if the filter is clogged, method 600 moves to 624 to indicate filter replacement request. Otherwise, method 600 continues monitoring engine operation at 606.

FIG. 7 illustrates the status of multiple actuators and engine operating parameters over time while implementing method 600 of FIG. 6. Plot 710 shows status of the vehicle key. The key may be on or off as indicated by the y-axis. Plot 720 shows engine speed. The engine speed increases as indicated by the arrow of the y-axis. Plot 730 shows speed of the electric motor coupled to the compressor. The motor speed may be positive or negative to the air flow in opposite directions through the air filter. As an example, when the motor speed is positive, air flow rate 740 through the air filter is positive, and air flows in a first direction from atmosphere to the compressor through the air filter (shown as 130 in FIG. 1 and FIG. 3). When the motor speed is negative, air flow rate 740 is negative, and air flows in a second direction from the compressor to the atmosphere through the air filter (shown as 131 in FIG. 1 and FIG. 3). Plot 750 shows pressure drop across the air filter. The pressure drop is the absolute value of the pressure difference across the air filter. The pressure drop increases as indicated by the arrow of the y-axis. Plot 760 shows status of the air filter replacement request. The air filter replacement request may be on or off.

From t0 to t1, the vehicle key is on. Engine speed is nonzero. The motor speed is adjusted based on engine operating parameters including engine speed. Air flow rate and the pressure drop vary based on engine operation.

At t1, engine speed reaches zero and the engine is off.

At t2, the controller starts to diagnose the air filter by actuating the motor. In one example, the controller may determine to diagnose the filter responsive to pressure drop 750 during engine running (from t0-t1) higher than threshold 751. In another example, the controller may determine to diagnose the filter responsive to a time duration since last filter diagnosis. The motor speed increases positively to flow the air in the first direction, as indicated by the positive increase of air flow rate 740.

At t3, the motor speed passes zero speed while moving from a positive motor speed to a negative motor speed. The air flow rate also passes zero while moving from a positive air flow rate to a negative air flow rate. As such, the air starts to flow in a second direction after being flowed in the first direction. The air filter may be diagnosed based on an average of the pressure drop measured while flowing the air in both directions through the filter to increase the statistical significance of the diagnosis.

At t4, responsive to the averaged pressure drop higher than threshold 752, the filter replacement request is turned on from off. The motor is turned off at t5.

At t6, the engine speed increases from zero, and the motor is operated based on engine operating conditions.

At t7, the engine and the motor are turned off responsive to key-off event.

In this way, air filter status may be diagnosed during engine off by operating the motor coupled to the electric boosting device. The diagnosis is based on pressure measurement while flowing the air through the air filter via the motor. The technical effect of filter diagnosis during engine off is that the signal to noise ratio may be improved. Further, the air filter may be diagnosed timely in a hybrid vehicle, where engine running time is limited. The technical effect of opening the HP-EGR valve and flowing the air from the air filter to the exhaust passage bypassing the cylinder is that the air restriction caused by engine components other than the air filter is avoided. Further, emission due to flowing air through the cylinder may be avoided. The technical effect of operating the motor to flow air in a reversed direction from engine operation is that the air filter diagnosis may be carried on in vehicle systems without HP-EGR passage. The technical effect of flowing the air in both the first and the second directions during engine off is that the diagnosis may be more statistically significant.

As one embodiment, a method for an engine comprises: during engine off, opening a high pressure exhaust recirculation (HP-EGR) valve; flowing air through an air filter by actuating a motor coupled to a compressor; sensing an air pressure; and indicating status of the air filter based on the air pressure. In a first example of the method, the method further comprises flowing the air from the air filter to an exhaust passage of the engine, bypassing a cylinder. A second example of the method optionally includes the first example and further includes wherein the compressor is further coupled to a turbine. A third example of the method optionally includes one or more of the first and second examples, and further includes flowing the air from the air filter to an exhaust passage, bypassing the turbine. A fourth example of the method optionally includes one or more of the first and third examples, and further includes opening a compressor recirculation valve coupled to a second compressor while actuating the motor. A fifth example of the method optionally includes one or more of the first and fourth examples, and further includes wherein the second compressor is coupled between the compressor and the engine. A sixth example of the method optionally includes one or more of the first and fifth examples, and further includes wherein the air pressure is an air pressure difference across the air filter, and wherein the flowing and sensing are carried out during multiple distinct engine off periods separate by engine running conditions and the indication is based on multiple of said sensed air pressures, where during each of the flowing conditions the motor is operated at a speed set based on ambient pressure. A seventh example of the method optionally includes one or more of the first and sixth examples, and further includes wherein the air pressure is measured between the air filter and the compressor. An eighth example of the method optionally includes one or more of the first and seventh examples, and further includes indicating status of the air filter by comparing the air pressure with a characterized air pressure.

As another embodiment, a method comprises: during a first condition, flowing air through an air filter in a first direction and sensing a first air pressure; during a second condition, actuating a motor to flow air through the air filter in a second direction, opposite to the first direction, and sensing a second air pressure; and indicating an air filter replacement request based on the first air pressure and the second air pressure. In a first example of the method, the first condition is during engine operation, and the second condition is during engine off. A second example of the method optionally includes the first example and further includes wherein the first condition and the second condition are during engine off, and further comprising flowing the air through the air filter in a first direction by actuating the motor. A third example of the method optionally includes one or more of the first and second examples, and further includes wherein the first air pressure and the second air pressure are sensed via a sensor. A fourth example of the method optionally includes one or more of the first and third examples, and further includes wherein the sensor located between the air filter and a compressor. A fifth example of the method optionally includes one or more of the first and fourth examples, and further includes indicating the air filter replacement request based on a weighted sum of the first air pressure and the second air pressure.

As yet another embodiment, a vehicle system, comprises: an engine including a cylinder; an intake air passage for inducting ambient air to the engine; an exhaust passage coupled to an engine exhaust manifold; an air filter coupled to the intake air passage; a compressor coupled to the intake air passage for supplying charged air to the engine; a motor coupled to the compressor; an EGR valve coupled to a HP-EGR passage for recirculating exhaust gas from the engine exhaust manifold to an engine intake manifold; a controller with computer readable instructions stored on a non-transitory memory for: shutting down the engine during key-on condition; actuating the motor to flow air through the air filter to the compressor; opening the EGR valve to flow the air from the compressor to the exhaust passage, bypassing the cylinder; determining an air pressure; and indicating air filter replacement based on the determined air pressure. In a first example of the method, the air pressure is a pressure drop across the air filter, and the controller is further configured for indicating air filter replacement responsive to the pressure drop higher than a threshold. A second example of the method optionally includes the first example and further includes wherein the compressor is an electric supercharger, and the system further comprising a turbocharger coupled to the engine. A third example of the method optionally includes one or more of the first and second examples, and further includes wherein the controller is further configured for opening a compressor recirculation valve and a waste-gate valve of the turbocharger while actuating the motor. A fourth example of the method optionally includes one or more of the first and third examples, and further includes wherein the controller is further configured for adjusting geometry of the turbocharger while actuating the motor.

In another representation, a method for an engine of a hybrid vehicle comprises: during engine off, opening a high pressure exhaust recirculation (HP-EGR) valve; flowing air through an air filter by actuating a motor coupled to a compressor; sensing an air pressure; and indicating status of the air filter based on the air pressure.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine comprising:
during engine off, opening a high pressure exhaust recirculation (HP-EGR) valve;
flowing air through an air filter by actuating a motor coupled to a compressor;
sensing an air pressure; and
indicating status of the air filter based on the air pressure.

2. The method of claim 1, further comprising flowing the air from the air filter to an exhaust passage of the engine, bypassing a cylinder.

3. The method of claim 1, wherein the compressor is further coupled to a turbine.

4. The method of claim 3, further comprising flowing the air from the air filter to an exhaust passage, bypassing the turbine.

5. The method of claim 1, further comprising opening a compressor recirculation valve coupled to a second compressor while actuating the motor.

6. The method of claim 5, wherein the second compressor is coupled between the compressor and the engine.

7. The method of claim 1, wherein the air pressure is an air pressure difference across the air filter, and wherein the flowing and sensing are carried out during multiple distinct engine off periods separate by engine running conditions and the indication is based on multiple of said sensed air pressures, where during each of the flowing conditions the motor is operated at a speed set based on ambient pressure.

8. The method of claim 1, wherein the air pressure is measured between the air filter and the compressor.

9. The method of claim 1, further comprising indicating status of the air filter by comparing the air pressure with a characterized air pressure.

10. A method comprising:
during a first condition, flowing air through an air filter in a first direction and sensing a first air pressure;
during a second condition, actuating a motor to flow air through the air filter in a second direction, opposite to the first direction, and sensing a second air pressure; and
indicating an air filter replacement request based on the first air pressure and the second air pressure.

11. The method of claim 10, wherein the first condition is during engine operation, and the second condition is during engine off.

12. The method of claim 10, wherein the first condition and the second condition are during engine off, and further comprising flowing the air through the air filter in a first direction by actuating the motor.

13. The method of claim 10, wherein the first air pressure and the second air pressure are sensed via a sensor.

14. The method of claim 13, wherein the sensor located between the air filter and a compressor.

15. The method of claim 10, further including indicating the air filter replacement request based on a weighted sum of the first air pressure and the second air pressure.

16. A vehicle system, comprising:
- an engine including a cylinder;
- an intake air passage for inducting ambient air to the engine;
- an exhaust passage coupled to an engine exhaust manifold;
- an air filter coupled to the intake air passage;
- a compressor coupled to the intake air passage for supplying charged air to the engine;
- a motor coupled to the compressor;
- an EGR valve coupled to a HP-EGR passage for recirculating exhaust gas from the engine exhaust manifold to an engine intake manifold;
- a controller with computer readable instructions stored on a non-transitory memory for:
    - shutting down the engine during key-on condition;
    - actuating the motor to flow air through the air filter to the compressor;
    - opening the EGR valve to flow the air from the compressor to the exhaust passage, bypassing the cylinder;
    - determining an air pressure; and
    - indicating air filter replacement based on the determined air pressure.

17. The vehicle system of claim 16, wherein the air pressure is a pressure drop across the air filter, and the controller is further configured for indicating air filter replacement responsive to the pressure drop higher than a threshold.

18. The vehicle system of claim 16, wherein the compressor is an electric supercharger, and the system further comprising a turbocharger coupled to the engine.

19. The vehicle system of claim 18, wherein the controller is further configured for opening a compressor recirculation valve and a waste-gate valve of the turbocharger while actuating the motor.

20. The vehicle system of claim 18, wherein the controller is further configured for adjusting geometry of the turbocharger while actuating the motor.

* * * * *